Sept. 8, 1970 M. M. ADAMS 3,528,022

TEMPERATURE COMPENSATING NETWORKS

Filed Oct. 14, 1965

MAX M. ADAMS

BY

ATTORNEY

United States Patent Office 3,528,022

Patented Sept. 8, 1970

3,528,022

TEMPERATURE COMPENSATING NETWORKS

Max M. Adams, Cincinnati, Ohio, assignor to General Electric Company, a corporation of New York Filed Oct. 14, 1965, Ser. No. 495,957

Int. Cl. H03f *1/32, 3/68*

U.S. Cl. 330—30 5 Claims

ABSTRACT OF THE DISCLOSURE

A bridge network is formed by a combination of resistors which respectively vary in a nonlinear function over a given temperature range and have a constant resistance value over the temperature range. The output of this resistance network gives a variable voltage output which is applied to the bases of a pair of transistors in a differential amplifier and provides temperature compensation to prevent "null drift" over a given temperature range.

The present invention relates to improvements in temperature compensating networks and methods for providing such networks which are particularly adapted for use with direct current amplifiers and more specifically direct current, differential, operational amplifiers.

The use of direct current amplifiers has in recent years become more and more attractive, particularly in light of the introduction of magnetic amplifiers and differential, operational amplifiers. The direct current amplifier offers many advantages in simplicity, economy, and gain stability, these and others being well known to those skilled in the art.

The potential use of such direct current amplifiers has, however, been limited by the fact that when the ambient operating temperature varies over any substantial range, an erroneous or false output signal is generated. This condition is commonly referred to as "null drift" and may be further understood by reference to transistorized, differential amplifiers which employ transistors that operate in pairs. Such transistors can be accurately matched in characteristics for a given temperature. However, as a practical matter it is impossible to obtain matched transistors which have the same characteristics over any substantial temperature range, and it is these differences in characteristics that cause the generation of a temperature error signal or shift.

It has been proposed to provide various types of feedbacks to eliminate this problem and also to maintain the amplifier at constant ambient temperature to avoid the problem. Such solutions can be effective, but are usually complicated and expensive. Because of the number and types of components employed in such prior temperature compensation schemes, their overall systems reliability is relatively low. This is to say that all components have a theoretical, predictable failure rate which is sharply reduced as the number of parts increases.

It will further be pointed out that in most instances the null drift characteristics of such amplifiers is nonlinear and varies widely as to the curvature and slope of the nonlinearity from amplifier to amplifier.

The object of the present invention is to minimize, if not eliminate, null drift in direct current amplifiers and to do so in a simple, economical and reliable fashion.

A further and ancillary object of the invention is to obtain the above ends through the use of a passive network which may be selectively determined to provide a nonlinear compensation by a practical method employing a minimum number and types of components.

These ends are obtained by the provision of a temperature compensating network comprising first resistance means which are nonlinearly variable with temperature over a given range and second resistance means connected in series therewith across a power supply. A compensating output is derived intermediate these resistance means to provide a voltage therefrom which varies in a nonlinear fashion providing a compensating potential of predetermined slope and curvature over the given temperature range.

Preferably the compensating network is in the form of a resistance bridge, one branch of which is formed by the first and second resistance means and the other branch of which is formed by a voltage divider comprising resistors which have a substantially constant value over said temperature range. One output from this bridge is derived from between the first and second resistance means and the other output is derived from the voltage divider so that the differential output thereof not only has a predetermined slope and curvature over a given temperature range but also a predetermined magnitude at a given temperature.

These ends may be best obtained by establishing a reference network in which the first resistance means comprises a pair of series-connected resistors, one of which has a constant value over the temperature range and the other of which has a nonlinearly variable value over such range. The total impedance of the first resistance means is selected to be substantially greater than that of the second resistance means. The second resistance means includes a pair of parallel-connected resistors, one of which has a constant value and the other of which is formed of the same material as the nonlinearly variable resistor of the first resistance means. With this arrangement a reference circuit is provided as a starting point from which the exact values of the two parallel resistors can be accurately and readily chosen to obtain the desired compensating effect for a given amplifier.

This reference circuit is then matched to the individual requirements of the given amplifier by determining the slope, curvature, and magnitude or offset of the corrective voltage required at the input to the amplifier to minimize, if not completely eliminate, null drift over the temperature range. Having selected the values of the resistors for the second resistance means for proper slope and curvature correction, the values of the resistors for the constant value voltage divider can then be readily determined to provide the proper offset for the compensating current to be provided to the differential amplifier.

The above and other related objects and features of the invention will be apparent from a reading of the following description of the disclosure found in the accompanying drawing and the novelty thereof pointed out in the appended claims.

Figures 1, 2, 3, 4, 5:
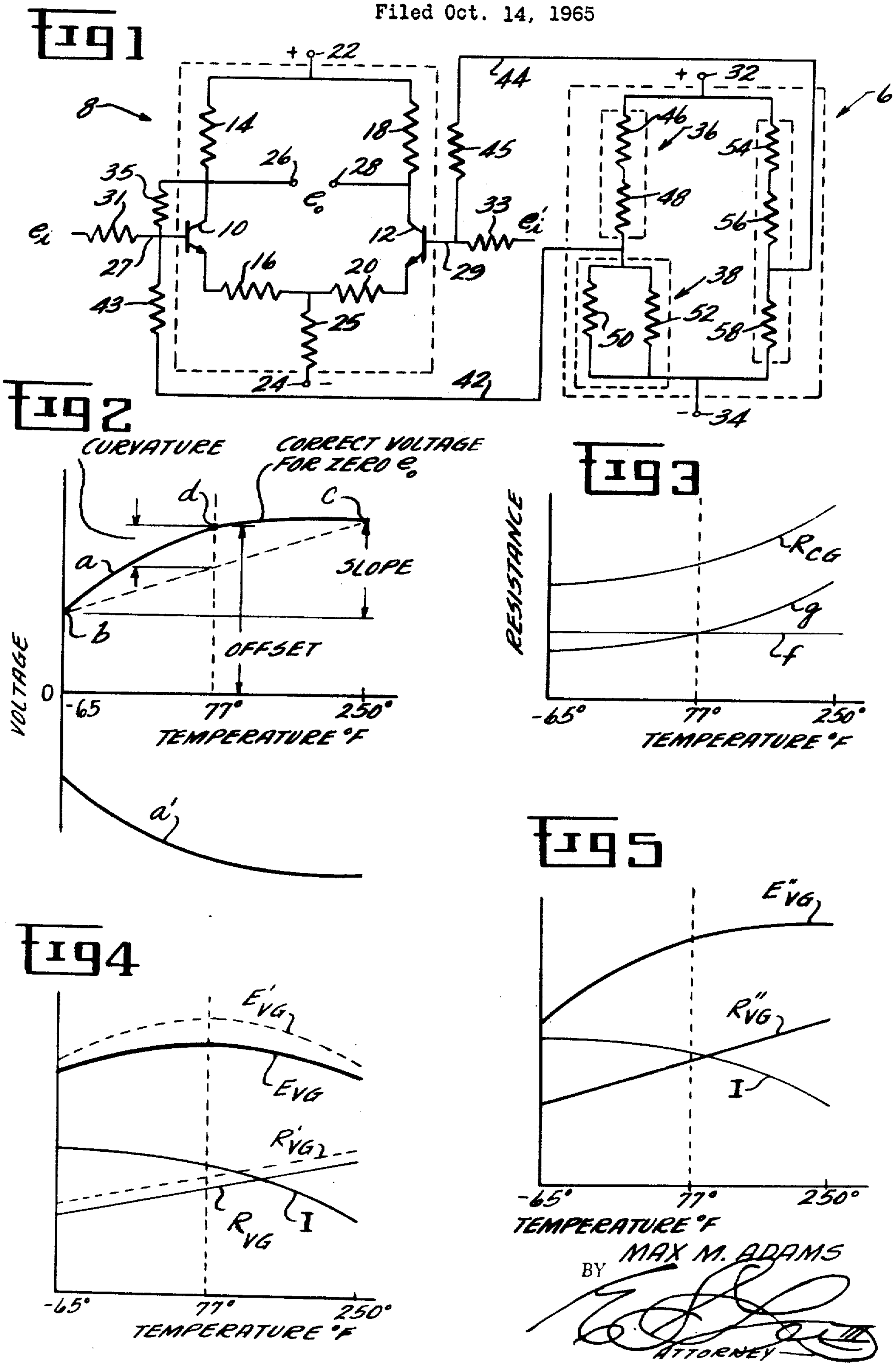
FIG. 1 is a schematic showing of a preferred embodiment of the present compensating circuit in combination with a differential, operational amplifier.
FIGS. 2, 3, 4 and 5 are voltage and temperature plots illustrating the mode of operation of the present compensating circuit.

FIG. 1 illustrates a preferred embodiment of the present compensating network 6, as it would be used with a direct current, differential, operational amplifier 8, which itself is simplified in design. Briefly describing the differential amplifier 8, a pair of transistors 10 and 12 are respectively connected in series with resistors 14, 16 and 18, 20 across the positive and negative terminals 22 and 24 respectively of a direct current power supply (not shown) with a common resistor 25 intermediate the resistors 16 and 20 providing a coupling to the negative terminal.

Leads 27 and 29 are respectively connected to the bases of the transistors 10 and 12 and input signals $e_1$ and $e'_1$ thereon through summing resistors 31, 33, thus providing an input to the operational amplifier 8. The input signals may be derived in any known fashion and may reflect whatever parameter is involved in the overall circuit of which the amplifier 8 is a component of known function and utility. The output of the amplifier 8 is derived from terminals 26 and 28 as an output signal $e_0$. A negative feedback is provided from the collector of transistor 10 through resistor 35 in the usual fashion. Lead 27 is thus the inverting input to the amplifier 8. As has been indicated, such amplifiers and their manner of operation are well known to those skilled in the art, the present circuit, as thus described, is therefore exemplary. Variations and refinements of such amplifiers, including the use of function generating feedbacks as well as other D-C amplifiers would be within the scope of utility of the present invention.

While the transistors 10 and 12 can be accurately matched at a given temperature to have substantially identical characteristics, nonetheless variations in characteristics do occur over any substantial range of temperature variation. These differences in characteristics, in effect, result in the generation of internal voltages which appear as an erroneous output signal $e_0$.

Each operational amplifier will therefore have its own individual characteristic output of an erroneous signal, caused by temperature variations. FIG. 2 illustrates a representative plot of corrective input voltage to the amplifier which must be provided to maintain the output $e_0$ substantially constant over a given temperature range which is illustratively shown as −65° to 250° F. As a matter of convenience the curve *a*, for a given amplifier, may be plotted with sufficient accuracy by measuring the corrective voltage requirements at the temperature extremes (points *b* and *c*) and the corrective voltage requirement at an intermediate temperature, conveniently ambient room temperature, which is illustratively shown as 77° F. (point *d*).

The corrective curve *a* of FIG. 2 has three parameters which are employed in determining the specific values of the components in the compensating network 6. First is the "curvature" represented by the voltage difference between point *d* and the intersection of the room temperature ordinate with a straight line between points *b* and *c* (indicated by legend in FIG. 2). Second is the "slope" characteristic of curve *a* represented by the voltage differential between points *b* and *c*, and third is the offset of line *a* represented by the voltage potential of point *d*. The significance of these parameters to the compensating network 6 will be better understood from the following detailed description thereof. These terms of reference, viz., curvature, slope, and offset will be employed throughout in describing other curves without redefinition.

Preferably the corrective circuit is in the form of a resistance bridge connected across positive and negative terminals 32, 34 respectively of an appropriate D-C power supply (not shown). One branch of this bridge circuit comprises, as one arm, a current generator 36 and, as another arm, a voltage generator 38. The other branch of the resistance bridge comprises an offset generator 40. The output of the resistance bridge is derived from lines 42 and 44, extending respectively from a point intermediate the current generator 36 and the voltage generator 38 and from an intermediate point on the offset generator 40. The differential output of the compensating network 6 is impressed on the input leads 27, 29 through summing resistors 43, 45 respectively.

It is well known that different resistors have different characteristics over a given temperature range. One type has a resistance which is substantially unchanged or invariable over a given temperature range and more specifically the operating temperature range for the amplifier. Use of the term "constant resistor" herein shall specify a resistor having such a characteristic without further description thereof. A second type of resistor has a resistance which increases progressively but nonlinearly with an increase in temperature over a given temperature range; use of the term "nonlinear resistor" herein shall specify a resistor having such a characteristic without further description thereof. Such characteristics are respectively exemplified by curves *f* and *g* in FIG. 3. This latter type of resistor in the present case is considered as having a "sagging characteristic" as compared with a linearly varying resistor where the increase in resistance would be directly proportional to temperature increases. Such resistors are well known in the art. A "constant" resistor, commonly used, is formed of an alloy comprising 75% Ni, 20% Cr, 2.5% Al, and 2.5% Cu. A "nonlinear" resistor which is preferred is formed of an alloy comprising 70% Fe and 30% Ni.

One of the important features of the compensation network 6 is that the current generator 36 has a much greater impedance (resistance) than the voltage generator 38. An impedance ratio of at least approximately 100:1 is preferred. Thus the current flow through the branch of the bridge comprising arms 36 and 38 is controlled substantially solely by the impedance of the current generator 36.

For reasons hereinafter discussed in greater detail, the current generator 36 comprises a constant resistor 46 and a nonlinear resistor 48, respectively having the characteristics illustrated by the curves *f* and *g* in FIG. 3. Since the series resistance of the resistors 46 and 48 is the summation of the values represented by the curves *f* and *g* in FIG. 3, the series resistance thereof may be represented by curve $R_{CG}$ in FIG. 3, and the current flow therethrough at all times would have the characteristic of curve I in FIG. 4, over the temperature range of interest.

Having thus established a characteristic current flow through this branch of the bridge circuit, attention will next be directed to the voltage generator 38 which comprises a low impedance, parallel pair of resistors 50 and 52, which are respectively a "constant" resistor and a resistor which is temperature responsive, preferably a "nonlinear" resistor.

To illustrate one of the features of the invention it will first be remembered that the parallel resistance of a constant resistor and a linearly variable resistor connected in parallel varies in a nonlinear fashion over a given temperature range. By the preferred use of a "constant" resistor 50 and the "nonlinear" resistor 52 a compensating effect is obtainable whereby over a given temperature range the resistance of the voltage generator varies in a substantially linear fashion as indicated by the curve $R_{VG}$ in FIG. 4 when the resistance values of the resistors 50 and 52 are approximately equal at room temperature.

As was indicated above, it is preferred that the values of the resistors 46 and 48 be approximately equal at room temperature. This preference is related to the preferred use of "nonlinear" resistors formed of the same material for both the resistors 48 and 52, advantageously an alloy of 70% Fe, 30% Cr. This relationship is further related to the discovery that by selecting the values of the resistors 50 and 52 of approximately equal values at room temperature, the voltage drop $E_{VG}$ (FIG. 4) will be approximately equal at the temperature extremes of the temperature range and thus has a zero slope which is a preferred reference starting condition. Having reference to the corrective parameters defined in connection with curve *a* in FIG. 2, the reference curve $E_{VG}$ would have a "curvature" less than that of curve *a*, a zero "slope" which is also less than the positive slope of curve *a*, and an offset greater than that of curve *a*. From this comparison it will be seen that FIG. 4 thus illustrates a reference point for selecting the exact values of the various resistors in the bridge circuit to obtain the requisite corrective voltage input to the operational amplifier 8.

The curvature of the voltage curve $E_{VG}$ could be varied either by changing the impedance of the current generator 36 or the voltage generator 38. The latter procedure is preferred. Curve $R'_{VG}$ illustrates that an increase in the total impedance of the voltage generator results in a curve $E'_{VG}$ having a greater curvature, which is obtained by a relatively small increase in the overall resistance of the branch impedance and a negligible variation in the current flow represented by curve I. Next it will be noted that the corrective curve *a* has a positive slope. Introduction of a "slope" correction in the reference network is obtained by varying the relative values of the resistors 50 and 52. Where a positive slope is required, it is necessary that the voltage drop across the voltage regulator 38 be more temperature-responsive. Thus the value of the nonlinear resistor 52 is proportionately reduced in value relative to the constant resistor 50 so that the parallel impedance more closely approximates a nonlinear characteristic. In FIG. 5 curve $R''_{VG}$ reflects the necessary changes in values of resistors 50 and 52 to give an impedance characteristic for the voltage generator 38 which will result in a voltage drop thereacross (curve $E''_{VG}$) having the same slope and curvature of curve *a* in FIG. 2.

The necessary offset of the corrective voltage input is obtained by means of the other branch of the resistance bridge circuit and particularly the selected values of the resistors 54, 56 and 58. Thus the voltage drop across 58 may be established at room temperature, at a value such that the difference between the voltage $E_{VG}$ and $E''_{VG}$ equals the desired offset of curve *e*, as defined in FIG. 2. As a matter of practicality, the resistors 54, 58 may be selected to give an offset approximating the expected requirement and the value of resistor 56 selected to give essentially the exact offset. Thus the differential input of lines 42 and 44 from the voltage compensating network provides an input to the operational amplifier which is the same as, or closely approximates curve *a*, of FIG. 2, thereby eliminating or at the least minimizing to a tolerable limit, erroneous output signals from the operational amplifier as a result of changes in its ambient operating temperature over the selected range of interest.

Having described the corrections necessary to modify the reference curve $E_{VG}$ to obtain the desired corrective curve *a*, it will be further noted that the amount of curvature correction having been described and the obtaining of a positive slope correction, negative curvature, and slope corrections are also obtainable. Dealing with the latter first, the preferred selection of approximately equal values for the resistors 50 and 52 at room temperature facilitates a negative slope correction in that by decreasing the value of the "constant" resistor 50, the impedance of the voltage generator 38 will tend to be more nearly a constant and the voltage change thereacross as a result of temperature variations will give a higher potential at the low extreme than at the upper extreme.

If a negative curvature correction is required, i.e., the corrective curve were concave upwardly as opposed to the downwardly concaved curve *a*, the corrective procedure is essentially as before described. Thus in FIG. 2, curve *a'* represents such an upwardly concave curve. The manner of correction is to swing this curve about the zero voltage abscissa (coincidentally it would coincide with curve *a*); calculate the curvature, slope and offset corrections as before and then switch the leads 42 and 44 so that the lead 44 is connected to the inverting input to the amplifier.

While certain preferred relationships have been given for the use of a 70% Fe, 30% Cr alloy, nonlinear resistor, it will be apparent to those skilled in the art that other nonlinear resistors may be employed and that the values of all such resistors may be readily determined by routine experimentation in accordance with the teachings herein. The scope of this invention is therefore to be derived solely from the following claims.

Having thus described the invention, what is claimed as novel and desired to be secured by Letters Patent of the United States is:

1. A temperature compensating network for regulating the null drift of a differential amplifier comprising:

a first circuit including a series combination of a first resistance means nonlinearly variable over a given temperature range and a second resistance means nonlinearly variable over said temperature range;

a second circuit including a plurality of constant resistors connected in series;

said first and second circuits being connected in parallel;

means for deriving a first output intermediate said first circuit;

means for deriving a second output intermediate said second circuit;

said first output comprising a compensating potential of predetermined slope and curvature over said temperature range;

said second output comprising a compensating potential of predetermined magnitude;

means for connecting said first and second outputs respectively to a first and second input respectively of a differential amplifier to minimize the null drift in said amplifier.

2. A temperature compensating network as recited in claim 1 wherein said first resistance means comprises a constant resistor connected in series with a temperature variable resistor.

3. A temperature compensation network as recited in claim 2 wherein said second resistance means comprises a constant resistor connected in parallel with a temperature variable resistor.

4. A temperature compensating network as recited in claim 3 wherein said temperature variable resistors are formed of the same material, and further characterized by the fact that said series connected constant resistor and temperature variable resistor have approximately the same resistance values at a given temperature within said temperature range.

5. A temperature compensating network as recited in claim 3 wherein said parallel connected constant resistor and temperature variable resistor have approximately the same resistance values at room temperature.

References Cited

UNITED STATES PATENTS 3,200,349 8/1965 Bangert ---------- 331—109 X

FOREIGN PATENTS 1,304,541 8/1962 France.

ROY LAKE, Primary Examiner

L. J. DAHL, Assistant Examiner

U.S. Cl. X.R.

330—23